Patented June 20, 1939

2,163,560

UNITED STATES PATENT OFFICE 2,163,560

PARASITICIDAL COMPOSITIONS

William B. Parker, Placerville, Calif., assignor to California Spray-Chemical Corporation, Berkeley, Calif., a corporation of Delaware No Drawing. Application July 25, 1938, Serial No. 221,163

13 Claims. (Cl. 167—28)

This invention pertains to the protection of vegetation against parasitic attack by means of petroleum oils and more particularly to a new form in which such oils are applied and to the oil compositions by means of which that form may be realized.

In my copending application Serial No. 741,722, of which this is a continuation in part, I disclose and claim certain mineral oil-soap compositions for use in the protection of vegetation against parasitic attack by depositing on the surfaces thereof a covering of more or less permanently discrete jelly-like oil droplets. This novel method of protection is however not limited to any specific jell-forming oil composition and it is with this broader aspect of my invention that the present specification has particularly to do.

In the field of colloid chemistry the term "gel" has come to mean a stable, optically empty, homogeneous elastic dispersion in which the disperse phase holds very considerable quantities of the dispersions medium with a tightness approaching that of a definite chemical bond. There are also many systems, known as "pseudo-gels", which differ in one or more respects from the true gels but whose over-all properties are closely similar. In these latter the disperse phase is more definitely fibrillar, approaching a microcrystalline state and forming a sort of paste with the dispersions medium. Departing still further from the true gels are those systems in which the disperse phase is definitely microcrystalline, the crystals being so long and interlaced as to give a physical structure which retains dispersions medium almost as effectively as it is held by the true and pseudo-gels.

In the practice of my herein described invention all three of the foregoing degrees of dispersion in oils are useful and the first two are substantially equivalent. For that reason and in order to avoid confusion I shall in the description and discussion which follows and in the appended claims refer to all such systems as "jells" and to the disperse phase as the "jelling" or "jell-forming" agent.

It was early recognized in the industry that the mineral oils boiling in the kerosene and the light gas oil range are by far the most toxic to insects, but it was also found that such oils alone were unsatisfactory as insecticides for two reasons: first, they were too volatile for efficient and economic pest control and second, when used in amounts sufficient to give satisfactory control, they were found to be too toxic to plants for general use.

It soon became obvious that plant damage by oil is directly dependent upon the extent to which, and possibly less directly upon the rate at which the oil is absorbed by the plant tissue and since the degree of absorption was assumed to be in inverse ratio to the viscosity, the apparent course for improvement lay in the direction of the higher boiling oils which are less volatile and more viscous even though at the same time less insecticidally potent.

It was found, however, that absorption could not be entirely eliminated by any operable increase in viscosity and that a new hazard to the plant resulted from the suffocating effect of a persistent continuous film of viscous oil. While the introduction of the more highly refined phytonomic oils substantially eliminated the residual toxic effect to the vegetation due to absorption at some further sacrifice in toxicity to insects and a substantial increase in cost, there appeared no way of mitigating the suffocating effect and yet retaining the enduring protection desired.

It is the object of the present invention to provide a method and means whereby the more insecticidally potent oils boiling as low as kerosene, or lower if desired, may be made to provide lasting protection to vegetation; whereby absorption of oil by the vegetation is eliminated to the point that ordinarily phytocidal oils may be safely used and whereby the plant suffocating effect produced by a continuous viscous oil film is substantially avoided.

This invention is based on my discovery that when mineral oils, jelled by having dispersed in them an appropriate jelling agent, are deposited as fine more or less permanently enduring droplets on a plant surface a complete protective coverage, so far as insects are concerned, is provided without causing the plant suffocation occasioned by a continuous oil film. Absorption of oil by the plant tissues is prevented by the limited area of contact between the treated surface and the more or less spherical droplets and also by the chemical and/or physical oil retaining action of the jell-forming agent. This action also prevents loss of oil by evaporation.

While a full discussion of the present accepted theoretical explanations of jell-formation is out of the question here a brief review in terms of solubility, polarity, molecular association, adsorption, solvation, etc. of oil dispersion systems in which oil constitutes the dispersions medium will give a basic concept of the oil-jells useful in the practice of the present invention. In order to avoid confusion in this, it must first be fully understood that these terms are largely relative and that even the term solubility, which expresses a fairly definite concept and may be quantitatively evaluated in simple systems, falls far short of denoting the same molecular state in all systems.

True oil-gels are formed by substances which, while lyophilic with respect to oil, do not go into true solution in it and on the other hand will not crystallize from it. The molecules of the disperse phase are associated in clusters or groups which hold tightly, by adsorption or solvation, a considerable number of molecules of the oil dispersions medium. Such systems usually result when the molecules of the disperse phase contain a considerable hydrocarbon part tending to pull them into solution in the oil and an also considerable polar or non-hydrocarbon part tending to prevent solution. They may also result when the molecules of the disperse phase are all hydrocarbon but of a structure quite different from that of the oil. Within certain limiting proportions each system has a rather definite temperature at which it passes from a viscous liquid to a weak plastic solid. In any given system this "setting" or gelling point may thus be arrived at by decreasing the proportion of dispersions medium or decreasing the temperature or both. With different pairs of individuals the limiting proportions permitting gel formation are quite different so that even within the same general class a rather wide range of gelling compositions is possible.

Pseudo oil-gels differ from the true oil-gels in that a slightly greater tendency to regular orientation is shown by the dispersed molecules. The aggregates formed are considered to be fibrillar in structure but are usually of such small cross section as to be visible with a powerful microscope only under certain favorable conditions. They are thus not strictly microcrystalline. Undoubtedly more orderly association exists between molecules of the dispersed phase and less inter-association with molecules of the dispersion medium than is the case in a true gel. Considerable proportions of the dispersing oil may never-the-less be tightly held by the disperse phase while the fibrillar structure of the latter adds an additional, purely physical barrier to the ready escape of oil.

A still further departure from the true oil-gels which is significant in the present consideration is to be found in oil dispersion systems in which the disperse phase is definitely though weakly crystalline. While in such systems there is usually some tendency to solvation of the molecules of disperse phase by oil the quantity of oil so held is less and its escaping tendency is higher than in the gels and pseudo-gels. The dispersed phase exists as a mat or sponge of inter-laced microcrystals giving to the system as a whole a structure which enables droplets formed from it to endure as such and to retain oil with considerable tenacity.

It will now be seen why an oil-jell, as hereinabove defined, when deposited in small discrete droplets will possess sufficient structural resistance to flow to remain in that form for long periods of time, if undisturbed, and will retain the oil both against loss by vaporization and against absorption by plant tissues.

The strength of an oil-jell structure is primarily dependent upon the proportions of oil and jell-forming agent. In order that oil may be readily released when the jell droplets are contacted by a moving insect it is of course necessary that the structure be as delicate as possible, consistent with maintaining the droplet form.

An oil dispersion system which is just at the point of jellation will provide the most delicate structure for efficiently releasing oil to the insect and will at the same time be most convenient to handle by the fluid handling means usually found in spray equipment. The point of incipient jellation is, of course, dependent upon the temperature, the relative proportions of oil and jell-forming agent and the specific character of the oil and of the jell-forming agent. In general the more similar the molecule of the jell-forming agent to that of the oil the greater the proportion of the agent necessary to cause jellation under a given set of conditions and the greater the tendency to association among molecules of the jelling agent the more stable the jell formed.

When the oil employed in the practice of my invention is quite volatile, boiling for instance substantially within the kerosene range, it will usually be found desirable to use a quantity of jell-forming agent just less than sufficient to cause jellation at the temperature at which the composition is to be applied. In other words, the composition should be just at the point of incipient jellation. When sprayed it will then loose sufficient oil by vaporization during its passage from the spray apparatus to the surface being treated, or very shortly thereafter, to increase the proportion of jelling agent to oil to the point at which the jell forms. By careful regulation in this regard it is possible to spray a fluid liquid and deposit a quite impossible plastic solid, the transition being automatically effected during the passage of the spray through the air. With less volatile oils it will usually be necessary to apply compositions that are just at or slightly above the point of jellation in order to insure that the droplets deposited are sufficiently immobile to avoid substantial coalescence into a continuous film.

While no utility of jelled light oil compositions has previously been recognized except possibly in highly specialized lubricating greases a rather wide range of oil jelling agents are never-the-less already available for use in preparing oil-jells suitable for use as insecticides in the practice of my invention. Of these the metal soaps and particularly the polyvalent metal soaps of organic acids containing eight or more carbon atoms are probably best known. Their dispersions in oil will therefore be discussed in some detail as illustrating the oil-jell compositions suited to use in the novel method of protecting vegetation which I have discovered.

Soaps of the trivalent metals such as aluminum, iron, chromium, etc., with the common fatty acids such as oleic, stearic, palmitic etc., form true gels in most mineral oils at relatively low concentrations, aluminum stearate, for instance, at one per cent by weight in a highly refined California kerosene giving a jelling composition which is of just about the right consistency for the insecticidal use here contemplated. With an oil base of less solvent power, such as a more highly refined kerosene or one from a more paraffinic crude, less than one per cent of this soap would be sufficient while with a better solvent oil as high as two to five percent might be required. Soaps of the same metal with other acids would be required in greater or less quantity depending on whether the specific nature of the organic radical tended to increase or decrease the solubility of the soap molecule as a whole in the oil. This point is particularly illustrated by the aluminum soaps of naphthenic acids, which acids are of course structurally most like and hence are most soluble in a naphthenic type oil. The aluminum soap of kerosene range naphthenic acids in a refined California kerosene does not alone cause jellation even at concentrations as high as ten per cent by weight. If however the mutual solubility is reduced in such a system by incorporating therein just the right quantity of water, usually from a fraction of one per cent to several per cent jellation follows almost immediately. The dinaphthenate of aluminum, being less soluble due to containing a smaller proportion of hydrocarbon part and an additional polar group, results in jellation at considerably lower concentrations without the addition of water.

The soaps of the divalent metals such as calcium, magnesium, copper, zinc, etc., with the above mentioned acids are less soluble in mineral oils than are the corresponding trivalent soaps and hence form gels or pseudogels at lower concentrations. The monovalent metal soaps are still less soluble and hence form only jells of the microcrystalline or sponge type.

In addition to the metallic soaps a wide range of other jell-forming agents have been found to be useful in the preparation of jelled oil parasiticides according to the present invention. Various of the softer thermo-plastic synthetic resins such as the hydrocarbon resins from the condensation of olefines with di-olefines and the paracumaroneindene resins may be used. Of the latter type a product sold as "Neville R–12" has been found to give a satisfactory jell at 10% in a 50 to 60 S. S. U. viscosity at 100° F. California oil refined to 90% unsulfonated residue. Hydrocarbon waxes such as paraffin wax may be used, roughly 10% in the above oil giving a stable jell. Many of the vegetable waxes are also suitable, 5% of carnauba wax in the above oil giving a typical jell. The oil-soluble natural resins may also be employed either as such or after neutralizing the free resin acids with ammonia or its equivalent. "Bogol", a resinous by-product of the wood pulp industry when neutralized with ammonia is quite satisfactory. Ordinary colophony may also be employed though the percentage necessary to produce jellation is relatively higher than with many of the other agents mentioned.

A particularly valuable class of jelling agents for use in the production of insecticidal oil-jells is to be found in the high molecular weight hydrocarbon polymers now being produced by the low temperature polymerization of gaseous olefines such as isobutene. These polymers are pure hydrocarbons and hence afford no possibility of any undesirable specific reaction with the treated plant tissues. They are available in a wide range of consistencies from highly viscous liquids having an average molecular weight of 2,000–3,000 to rubber-like solids having a molecular weight of 50,000 or more and hence may be selected for best results in any particular oil. As an example of this class of jelling agents a commercial product sold as "Vistanex #6" has been found to give satisfactory results at about 10% in the above mentioned 50–60 viscosity oil.

Another class of jelling agents which has been found especially adapted to the production of insecticidal oil jells according to the present invention comprises the partially esterified glycerols, glycols and polyglycols. A typical example is a diglycol stearate, sold as "'Glycoride", which at about 10% in an oil of substantially the above characteristics will produce a jell which is fully equivalent to the best soap-oil jells in this service and has the added advantage that no inorganic residue is left on the sprayed surface.

Several of the classes of jelling agents above enumerated may also be used in combination with other ingredients in the production of desirable insecticidal oil jells. In general where the molecule of the agent contains a highly hydrophilic atom or radical as for example in the soaps and the partially esterified polyhydric alcohols the addition of a small optimum amount of water may reduce the tendency to true solution of the agent in oil to the point that jellation occurs at a substantially lower concentration than when no water is present. This effect has already been mentioned in connection with the aluminum naphthenates, which well illustrate the principle involved. Other coacting molecules than water may operate in the same general way. For instance, 1% of diglycol laurate alone has no apparent jelling action on a light oil though 0.5% when used in combination with 0.5% to 0.75% of a synthetic wetting agent, sold as "Vatsol O. T.," will produce a satisfactory jell with the same oil. Still another instance of the same effect has been observed with the above mentioned ammonia neutralized "Bogol" which forms better jells when used in combination with an oil soluble petroleum sulfonate than when used alone.

While no attempt has been made to comprehend all possible classes of oil jelling agents in the foregoing examples a sufficiently wide variety of materials has been included to indicate the enormous number of oil-jell compositions available for use in the practice of my invention and to direct one skilled in the art to the type of material that may be best suited to any particular set of circumstances.

Since the point of incipient jellation is not always apparent from a visual inspection of a potential jell system a quick, simple and readily reproducible test for jellation has been developed which also gives a surprisingly good indication of the action to be expected of an oil-jell in insecticidal use. This test will hereinafter be referred to as the "drop on absorbent paper test". In this test a medium sized drop of the oil composition is delivered from a pipette, medicine dropper or other convenient device onto a plane surface of absorbent paper such as filter paper, blotting paper, or the like. With oil containing no jelling agent the drop will immediately spread producing an oil soaked ring which reaches its maximum diameter in a few seconds. When an oil jelling agent is present at a concentration materially below the point of incipient jellation the spreading of the oil ring is rapid at first but as the point of jellation is approached, due to removal of oil from the drop, it proceeds more slowly reaching its maximum only after a period of minutes, the drop of oil deposited flattening out but not immediately disappearing. When the jelling composition is substantially at the point of incipient jellation the oil ring proceeds outwardly from the drop a short distance and then apparently stops, attaining its maximum diameter only after several minutes, the oil droplet retaining substantialy its original form until, weakened by the slow loss of oil, it ultimately collapses and disappears. With a definitely formed jell, even though still adequately fluid to be handled by the dropping means, the drop will produce only a very narrow circumscribing oil ring and will retain its own identity for surprisingly long periods of time, usually many minutes and sometimes several hours or longer.

While the rate at which and the extent to which oil is absorbed from the composition is of course the point of practical consideration much insight into the nature of the jelling action produced by any agent or class of agents may be gained from a study, under appropriate magnification, of the droplet remaining at various stages during the absorption of the oil by the paper.

Even though the rate of oil absorption by any living plant tissue will be enormously slower than by an absorbent paper, as in the foregoing test, the relative absorbability of oil per se and oil from a jell composition shown by the test is believed to be truly indicative of the results to be obtained in the practice of my invention. Obviously if oil is withdrawn by a highly absorbent paper so slowly as to permit a jell droplet to retain its identity for a substantial time it would not be absorbed by a growing leaf in damaging quantity in many days. The test will also be found to provide a satisfactory means of determining the approximate proportions of jelling agent and oil for best results with any given oil dispersion system.

The best method of incorporating any particular jelling agent in an oil will of course depend somewhat on its individual characteristics but is deemed to be well within the skill of one familiar with oil insecticides broadly. In general, heating the oil to a temperature 50–100° F. above the temperature at which the composition is to be employed and introducing the jelling agent with efficient agitation will be found sufficient.

Since, as already pointed out, one of the principal features of my invention is the provision of a protective covering for vegetation which is substantially complete so far as insects are concerned but substantially discontinuous so far as the respiratory system of the plant is concerned, the oil-jell composition insecticides should be deposited in separate droplets of more or less uniform size and close enough together that the uncovered areas are not large in comparison to the area covered by the insects against which protection is desired. It therefore follows that a means which will produce a uniform and readily controlled spray will give best results in the application of a jelled oil insecticide.

The method which I have found particularly well suited to the formation of such a deposit consists in dispersing the oil-jell composition in a large volume of rapidly moving low pressure air as broadly disclosed and claimed in my copending application, Serial No. 635,861.

In this method I atomize the oil composition into a relatively large body of moving air, supplied by a centrifugal blower or its equivalent, just prior to passing the air stream through an appropriate head or fish-tail nozzle for directing it onto and around the vegetation being treated. The same effect is also produced by dispersing the oil composition into the slip-stream or wash of an aeroplane the dispersion being from the trailing edge of the wing or an equivalent position. The atomizing means may be either of the aspirator or pressure type but in any event should be susceptible of rather accurate control to give oil droplets of substantially uniform size and constant quantity irrespective of the viscosity, density, etc., of the oil composition being applied. I have found that for best results the oil droplets should have a diameter between 70 and 300 microns and preferably between about 100 and 200 microns. With the more volatile oils of the kerosene type the droplets introduced into the air stream should therefore be slightly larger in order to remain within the optimum range until deposited.

The velocity of the carrying air stream will of course be determined largely by the distance from the machine that the oil fog produced must be carried in order to envelop the objects being treated. For most orchard and field work an air velocity of from 150 to about 900 feet per second will be found adequate with the optimum practical range being from 150 to about 300 feet per second.

By this method a relatively free floating oil fog or cloud is produced which may be so directed, either from a ground machine or a low flying plane, as to envelop the whole plant or tree and to deposit thereon a surprisingly complete and uniform covering of droplets. In addition to the uniformity of deposit and the completeness of coverage possible by the cloud method it is also of particular advantage in the deposition of oil-jell insecticides since the individual droplets settle more gently on the treated surfaces than when deposited more directly and more forcibly as in many of the older methods of spraying. Their original spherical shape is therefore less distorted by the impact and the surface of contact with the plant tissue is a practical minimum.

As previously indicated this is of enormous advantage since so long as the deposited droplets remain as separate spheres and the area of contact therefore remains small the amount of oil absorbed per unit of time can be only a very small fraction of what it woud be from a continuous film of the same composition. It is in large part for this reason that even the compositions which depart considerably from being true colloidal gels and owe their structure to mechanically interlaced fibrils or micro-crystals and hence have a minimum tendency to hold oil by other than gross physical means are nevertheless effective in preventing oil absorption by the treated vegetation.

One of the outstanding economic advantages possible through the use of jelled-oil insecticides arises from the fact that oil penetration having been substantially eliminated, far less highly refined, and hence far less costly oils may be utilized and they being more insecticidally potent, are required in considerably smaller quantity than is necessary with the conventional per se phytonomic oils to effect a given insect kill. A double saving is thus effected in the over-all cost of treatment. Oil solutions of particularly effective insecticides which have in the past been avoided due to their high toxicity to vegetation may also now be used with comparative safety.

While the principles and advantages hereinbefore set forth for oil-jell insecticides pertain particularly to compositions for application as such, it will be readily apparent to those skilled in the art that they will also apply equally well when the oil composition is used as a water-in-oil type emulsion and to a certain extent when use is by way of the conventional oil-in-water emulsion.

It will also be appreciated that while the major parasiticidal uses of mineral oils on vegetation require contact of the oil with the insect and hence would require an oil-jell of delicate structure it may sometimes be desirable to use the oil merely as a carrier for insect fumigants and/or stomach poisons. In such cases a jell of somewhat greater strength may be used with equal effect and with a still higher margin of safety to the treated vegetation. My invention therefore clearly comprehends the use of oil jells of all degrees of consistency from the point of incipient jellation to plastic jells having considerable rigidity.

Having now fully disclosed my invention which consists in protecting vegetation against parasitic attack by means of a coating of oil-jell droplets having substantial endurance as such, oil-jell compositions with which such a coating may be formed and a method particularly adapted to the deposition of such a coating I claim:

1. A horticultural parasiticide comprising a mineral oil having dispersed therein an oil jelling agent in quantity sufficient to produce incipient jellation.

2. A horticultural parasiticide comprising a nonviscous low boiling mineral oil having dispersed therein an oil jelling agent in quantity sufficient to produce incipient jellation.

3. A horticultural parasiticide comprising a mineral oil having dispersed therein a partially esterified polyhydric alcohol oil jelling agent in quantity sufficient to produce incipient jellation.

4. A horticultural parasiticide comprising a mineral oil having dispersed therein a high molecular weight olefine polymer oil jelling agent in quantity sufficient to produce incipient jellation.

5. A horticultural parasiticide comprising a mineral oil having dispersed therein an oil jelling agent derived from a natural resin in quantity sufficient to produce incipient jellation.

6. The method of preventing coalescence of drops of a mineral oil insecticidal composition and thereby preventing damage by said oil when applied to vegetation in droplet form which comprises dispersing in said oil a jell-forming agent in amount sufficient to produce incipient jellation.

7. The method of preventing coalescence of drops of a mineral oil insecticidal composition and thereby preventing damage by said oil when applied to vegetation in droplet form which comprises dispersing in said oil a partially esterified polyhydric alcohol oil jelling agent in quantity sufficient to produce incipient jellation.

8. The method of preventing coalescence of drops of a mineral oil insecticidal composition and thereby preventing damage by said oil when applied to vegetation in droplet form which comprises dispersing in said oil a high molecular weight olefine polymer oil jelling agent in quantity sufficient to produce incipient jellation.

9. The method of preventing coalescence of drops of a mineral oil insecticidal composition and thereby preventing damage by said oil when applied to vegetation in droplet form which comprises dispersing in said oil an oil jelling derivative of a natural resin in quantity sufficient to produce incipient jellation.

10. The method of protecting vegetation against parasitic attack and at the same time against damage from oil which comprises depositing on the surfaces of the vegetation separate drops of a mineral oil composition containing a jell-forming agent in amount sufficient to produce incipient jellation of said oil.

11. The method of protecting vegetation against parasitic attack and at the same time against damage from oil which comprises depositing on the surfaces of the vegetation separate drops of a mineral oil composition having an average diameter between about 70 and 300 microns and containing a jell-forming agent in amount sufficient to produce incipient jellation of said oil.

12. The method of protecting vegetation against parasitic attack and at the same time against damage from oil which comprises depositing on the surfaces of the vegetation separate drops of a mineral oil composition containing a jell-forming agent in quantity sufficient to produce incipient jellation, said deposition being effected by enveloping the vegetation in a floating fog-like mist of the oil composition in air produced by dispersing said oil composition in a relatively large volume of low pressure air having a velocity of about 150 to 300 feet per second, the dispersed oil particles having an average diameter between about 70 and 300 microns.

13. In the method of protecting vegetation from parasites which includes the use of a parasiticide in which a mineral oil is the essential parasiticidal ingredient, the steps which comprise adding to said mineral oil a jell-forming agent in amount sufficient to produce incipient jellation of said mineral oil, directing upon the vegetation to be protected a free-floating fog-like mist of the parasiticide containing said oil and said jell-forming agent, the individual particles of said fog-like mist having an average diameter between about 70 and 300 microns with a major portion thereof between 100 and 200 microns, thus depositing on the surfaces of the vegetation substantially separate droplets of said parasiticide.

WILLIAM B. PARKER.